(12) United States Patent
Fisset et al.

(10) Patent No.: US 9,051,060 B2
(45) Date of Patent: *Jun. 9, 2015

(54) ELECTROMAGNETIC HAZARD PROTECTOR FOR COMPOSITE MATERIALS

(75) Inventors: Emilie Fisset, London (GB); John Ellis, Duxford (GB); Paul Mackenzie, Purley (GB)

(73) Assignee: Hexcel Composites Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/504,967

(22) PCT Filed: Oct. 19, 2010

(86) PCT No.: PCT/GB2010/051759
§ 371 (c)(1),
(2), (4) Date: Apr. 30, 2012

(87) PCT Pub. No.: WO2011/051698
PCT Pub. Date: May 5, 2011

(65) Prior Publication Data
US 2012/0219745 A1    Aug. 30, 2012

(30) Foreign Application Priority Data
Nov. 2, 2009 (GB) .................. 0919088.5

(51) Int. Cl.
| | | |
|---|---|---|
| C09J 7/02 | (2006.01) |
| B32B 37/12 | (2006.01) |
| B32B 5/00 | (2006.01) |
| B32B 15/04 | (2006.01) |
| D03D 19/00 | (2006.01) |
| B64D 45/02 | (2006.01) |
| B32B 5/28 | (2006.01) |
| B32B 15/02 | (2006.01) |
| B32B 15/12 | (2006.01) |
| B32B 27/04 | (2006.01) |
| B32B 27/12 | (2006.01) |
| B32B 27/34 | (2006.01) |
| B32B 27/36 | (2006.01) |

(52) U.S. Cl.
CPC . *B64D 45/02* (2013.01); *B32B 5/28* (2013.01); *B32B 15/02* (2013.01); *B32B 15/04* (2013.01); *B32B 15/12* (2013.01); *B32B 27/04* (2013.01); *B32B 27/12* (2013.01); *B32B 27/34* (2013.01); *B32B 27/36* (2013.01); *B32B 2605/18* (2013.01)

(58) Field of Classification Search
USPC ........................................ 428/40.9; 156/247
See application file for complete search history.

(56) References Cited

U.S. PATENT DOCUMENTS 5,151,327 A * 9/1992 Nishiyama et al. ............ 428/343
5,225,265 A    7/1993 Prandy et al.
(Continued)

FOREIGN PATENT DOCUMENTS

| DE | 102006035847 | 2/2008 |
| GB | 2433467 | 6/2007 |
| WO | 2009128991 | 10/2009 |

*Primary Examiner* — Tahseen N Khan
(74) *Attorney, Agent, or Firm* — W. Mark Bielawski; David J. Oldenkamp (57) ABSTRACT

A curable flexible electromagnetic hazard resistance laminate, comprising a layer of electrically conductive metal material and thermosetting resin, wherein a first external face of the laminate comprises a releasable backing sheet in contact with resin, and a second external face of the laminate comprises resin, wherein the second external face has greater adhesiveness than the first external face with the backing sheet removed.

20 Claims, 7 Drawing Sheets

(56) References Cited

U.S. PATENT DOCUMENTS

| | | |
|---|---|---|
| 5,370,921 A | 12/1994 | Cedarleaf |
| 2003/0064223 A1 | 4/2003 | Simmons et al. |
| 2006/0292375 A1* | 12/2006 | Martin .......................... 428/413 |
| 2009/0258220 A1* | 10/2009 | Schaaf et al. ................. 428/332 |
| 2009/0264845 A1* | 10/2009 | Himori et al. ................. 604/367 |
| 2012/0308799 A1* | 12/2012 | Yamaguchi et al. .......... 428/220 |

* cited by examiner

ELECTROMAGNETIC HAZARD PROTECTOR FOR COMPOSITE MATERIALS

TECHNICAL FIELD

The present invention relates to electromagnetic hazard protectors, particularly lightning strike protectors, for application onto composite materials, suitable for application in an automatic tape lay-up apparatus.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

A common composite material is made up from a laminate of a plurality of fibre layers, interleafed with resin layers. Although the carbon fibres have some electrical conductivity, the presence of the interleaf layers means that this is only exhibited in the plane of the laminate. The electrical conductivity in the direction orthogonal to the surface of the laminate, the so-called z-direction, is low.

This lack of conductivity in the z-direction is generally accepted to contribute to the vulnerability of composite laminates to electromagnetic hazards such as lightning strikes. A lightning strike can cause damage to the composite material which can be quite extensive, and could be catastrophic if occurring on an aircraft structure in flight. This is therefore a particular problem for aerospace structures made from such composite materials.

A well known method of addressing this problem is to include a conductive element, e.g. metallic mesh or foil, at or near the external surface of the composite material.

A common way for such a conductive element to be applied is to deposit manually, by the hand of a skilled handler, the conductive element onto the surface of a mold for an aerospace body structure. Subsequently, the composite material, comprising sheets of structural fibres and thermosetting resin, typically in the form of prepregs, is laid on top of the conductive element. However, the structural layers tend to be laid down in an automated manner by means of a so-called automatic tape lay-up apparatus, or ATL.

A typical ATL machine requires a roll of material which is loaded onto a mandrel and fed via a system of rollers to the ATL head. Typically the route will involve a cutting stage and an optional heating stage. The cutting stage ensures that the dimensions of the material are exactly as required, as any deviation can result in an unacceptable finish. At the head of the ATL there is normally two application methods, the "shoe" of the ATL or the "compaction roller" of the ATL head. Whichever method is employed the material is brought down into contact with the surface and pressure is applied onto an uppermost backing sheet of release paper. The tacky lowermost surface adheres under pressure and the backing sheet is removed automatically. During an ATL process, the material being laid down is exposed to very high tensions of between 50 and 300 N over a typical product width of 300 mm.

Following the lay-up procedure, the arrangement is cured by exposure to elevated temperature, and optionally to elevated pressure, to produce a cured composite laminate. The cured laminate is taken from the mold and the conductive element is present as part of the structure on the exterior of the aerospace structure it is to form.

Composite materials have successfully been demonstrated to provide strong, lightweight and reliable structures for aerospace applications. There is thus a trend to an increasing use and gradual replacing of the traditional metallic structure. As a result, ever greater areas of aircraft are being produced from composite material. Consequently, the labour required to lay down the conductive element is becoming an increasing cost and time burden on the manufacture of such structures.

Ideally such conductive electromagnetic hazard protector elements would be laid down automatically, as the composite material is, however this is fraught with difficulty and no satisfactory automated solution is known to exist.

SUMMARY OF THE INVENTION

After some investigation, the present inventors have found that it is particularly difficult to provide an electromagnetic hazard protector which is capable of adhering to the surface of a mold and detaching from its backing sheet, whilst the protector remains coherent and remains bonded together during automated lay-up.

A fundamental difficulty is that the surface of a mold is designed to be difficult to adhere to in order that any formed product can be easily removed. Thus developing a substance to adhere to the mold is challenging. Furthermore, it must not only adhere to the mold but also must adhere to it more strongly than it does to any backing sheet it is attached to.

Thus, in a first aspect the invention relates to a curable flexible electromagnetic hazard resistance laminate, comprising a layer of electrically conductive metal material and thermosetting resin, wherein a first external face of the laminate comprises a releasable backing sheet in contact with resin, and a second external face of the laminate comprises resin, wherein the second external face has greater adhesiveness than the first external face with the backing sheet removed.

Such an electromagnetic resistance laminate has been found to adhere to mold surfaces and is able to detach from the backing sheet and thus can be laid down satisfactorily in an automated process.

In another aspect, the invention relates to the combination of a curable flexible electromagnetic hazard resistance laminate and a mold, the laminate comprising a layer of electrically conductive metal material and thermosetting resin, wherein a first external face of the laminate comprises a releasable backing sheet in contact with resin, and a second external face of the laminate comprises resin in contact with a molding surface of the mold, wherein the adhesive force between the second external face and the molding surface is greater than that between the backing sheet and the resin on the first external face.

As the laminate is a protector of conventional composite materials, and is intended to be combined with such material, such composite structures are not necessary in the laminate itself. Thus typically the laminate is free of layers of discrete fibres, e.g. the single strand fibres which are put together unidirectionally or woven to form a structural layer of the composite.

Additionally, the laminate typically comprises an unbroken pathway of resin through the thickness of the laminate to provide coherence. In other words, the two external faces of the laminate are preferably in resinous communication.

Automatic tape lay-up devices typically employ a roll of material prepared specifically for the apparatus. Thus, the laminate is preferably sufficiently flexible so as to be able to form a roll with a diameter of less than 20 cm, preferably less than 10 cm.

Known automatic lay-up apparatus requires the roll to satisfy particular dimensions. Thus, the roll is either wound onto a 254 mm or 295 mm inside diameter core within a tolerance of 0.5 mm either way and the roll is either 300 mm or 150 mm in length within a tolerance of 0.050 mm either way.

As such, the laminate is preferably not so thick that it cannot easily be rolled. Thus typically the laminate has a thickness of from 0.5 to 5.0 mm, preferably from 0.5 to 4.0, most preferably from 1.0 to 3.0 mm.

The conductive metal material is typically in sheet form, and may be porous or non-porous, e.g. an expanded metal foil. Preferably the metal material is porous where the pores may be microscopic or large open holes. In a preferred embodiment, the metal material is an expanded metal foil taking the form of a wire mesh material. If the metal material is non-porous then it will typically comprise discrete strips so that resin can bind the laminate together from both sides of the metal material.

The metal material may comprise a variety of conductive metals, for example bronze, aluminium, copper, silver, gold, nickel, zinc and tungsten. Copper is preferred due to its excellent electrical conductivity.

The thickness and weight of the conductive metal material can vary significantly according to whether a heavy duty or light duty lightning protector is required. The present invention works equally well over a range of thicknesses and weights and thus the conductive metal material preferably has a weight per unit area of from 50 to 1000 gsm. However, the invention is particularly suitable for the lower weight metal materials and thus preferably the metal material has a weight per unit area of from 50 to 500 gsm, more preferably from 50 to 200 gsm.

As the conductive metal material can be selected over a wide range of weights, the weight of the laminate can vary accordingly. However, the weight of the laminate excluding the metal material is typically more tightly controlled. Thus the weight per unit area of the laminate excluding the metal element is preferably less than 800 gsm, more preferably less than 500 gsm, most preferably less than 300 gsm.

It has also been found that the high tensions applied to such electromagnetic hazard resistance laminates during use of an automatic tape lay-up apparatus can cause deformation, stretching or reshaping of the conductive element, particularly when it is a highly ductile metal such as copper.

Thus, preferably the laminate further comprises a substantially non-reshapable sheet of solid material.

Substantially non-reshapable means that, when placed under the tensions encountered during automatic tape lay-up application, no significant stretching in the plane occurs and it retains its original shape. Thus the material could equally be described as being substantially non-extensible or substantially non-stretchable. Clearly the solid material is flexible and bendable but it achieves this without altering its shape. Another term describing this property is that the solid material is non-ductile.

By "substantially non-reshapable" is meant that the material extends by less than 1.0% when a strip of material 2.54 cm wide and 33.0 cm long is hung from one end and a 500 g mass is attached and evenly distributed across the other end of the strip for 1 minute. Preferably the material extends by less than 0.5%.

The substantially non-reshapeable solid material may be porous or non-porous. However, a porous material is advantageous as it allows uncured resin to flow through the pores during manufacture thus ensuring that a coherent laminate is formed with the solid material effectively embedded in resin.

The solid material may be electrically conductive or electrically insulating. However there may be advantages to lightning strike resistance if it is electrically insulating.

The material for the solid material can be selected from a number of possibilities such as glass fibre such as fabrics or veils and insulating polymers such as polyester and nylon.

A veil comprising short fibres of material and formed together randomly to form a mat, provides an excellent arrangement for a substantially non-reshapable material.

As the weight of the laminate is important to minimise, the solid material is typically of very low weight per unit area. Typically it has a weight per unit area of from 5 to 100 gsm, preferably from 5 to 50 gsm, more preferably from 5 to 40 gsm, most preferably from 5 to 20 gsm.

The backing sheet may be one of several typically used in the art in prepreg manufacture. Typically it is made from paper but may be made from other materials.

The thermosetting resin may be selected from those conventionally known in the art for use in composite manufacture, such as resins of phenol-formaldehyde, urea-formaldehyde, 1,3,5-triazine-2,4,6-triamine (melamine), bismaleimide, epoxy resins, vinyl ester resins, benzoxazine resins, polyesters, unsaturated polyesters, cyanate ester resins, or mixtures thereof.

Particularly preferred are epoxy resins, for example mono functional, difunctional or trifunctional or tetrafunctional epoxy resins. Preferred difunctional epoxy resins include diglycidyl ether of Bisphenol F (e.g. Araldite GY 281), diglycidyl ether of Bisphenol A, diglycidyl dihydroxy napthalene and mixtures thereof. A highly preferred epoxy resin is a trifunctional epoxy resin having at least one meta-substituted phenyl ring in its backbone, e.g. Araldite MY 0600. A preferred tetrafunctional epoxy resin is tetraglycidyl diamino diphenylmethane (e.g. Araldite MY721) A blend of di- and tri functional epoxy resins is also highly preferred.

The thermosetting resin may also comprise one or more curing agent. Suitable curing agents include anhydrides, particularly poly carboxylic anhydrides; amines, particularly aromatic amines e.g. 1,3-diaminobenzene, 4,4'-diaminodiphenylmethane, and particularly the sulphones, e.g. 4,4'-diaminodiphenyl sulphone (4,4' DDS), and 3,3'-diaminodiphenyl sulphone (3,3' DDS), and the phenol-formaldehyde resins. Preferred curing agents are the amino sulphones, particularly 4,4' DDS and 3,3' DDS.

The thermosetting resin is also typically present in discrete layers, possibly containing one or more porous sheets of the metal and, if present, the solid material embedded therein. Thus the metal material and, if present, usually also the solid material, will typically be adjacent to two resin layers, i.e. sandwiched between them, which may be in resinous communication with each other via the pores or openings in the metal material.

In a preferred embodiment, the sheet of substantially non-reshapable solid material is positioned between the conductive metal material and the backing sheet. It has been found that when the sheet of solid material is porous, resin tends to preferentially migrate towards the internal of the laminate, thus reducing the tackiness of the resin surface on the side comprising the sheet of (porous) solid material. By arranging for the solid material to be on the backing sheet side, the adhesiveness or tackiness of this external face is thus reduced.

Thus, in a preferred embodiment, the laminate comprises layers of material in order, starting with the backing sheet: a resin layer, the sheet of solid material, a resin layer, the metal material and a resin layer with a continuous unbroken pathway of resin through the thickness of the laminate.

However, it has also been found that the substantially non-reshapable solid material can provide a superior surface finish when it is positioned on the side of the metal material not covered in the backing sheet. This is because it covers the sometimes coarse surface of the metal material and provides for uniform and reduced resin flow.

Therefore in a further preferred embodiment, the laminate comprises a second substantially non-reshapable sheet of solid material. In this embodiment it has been found that having one sheet of solid material on either side of the metal material is particularly preferred because the surface finish of the material is improved whilst also remaining suitable for automated lay-up and further improvements in stretch in reshaping resistance are provided.

In order to help ensure that the relative adhesiveness is achieved, it is preferable that there is greater resin on the side of the metal material not containing the backing sheet than on the side containing the backing sheet. It is therefore preferred that the ratio of the amount of resin on the non-backed side to the backed side is greater than 1:1 but less than 10:1, preferably from 1.1:1 to 5:1, more preferably from 1.3:1 to 3:1.

The laminates according to the invention may be manufactured in a variety of ways. However, preferably they are manufactured continuously by bringing together layers of material.

Thus, in a further aspect, the invention relates to a process for the manufacture of an electromagnetic resistance laminate as described herein, comprising continuously feeding the sheet of electrically conductive metal material, and bringing into contact with the outer faces of the material two sheets backing material at least one of which is coated in thermosetting resin, thereafter compressing the sheets together and then removing a sheet of backing material.

If present, the substantially non-reshapable solid material is preferably co-fed with the metal material.

Typically the compression of the sheets is carried out by passing the sheets through one or more rollers, e.g. between two counter-rotating pinch rollers. During the compression stage the laminate is typically heated so as to reduce the viscosity of the resin without initiating curing, e.g. to a temperature of from 40 to 150° C.

In a preferred embodiment both sheets of backing material are coated in thermosetting resin.

The sheet of substantially non-reshapable solid material is preferably adhered to a resin coating which coats a sheet of backing material. This has been found to provide a coherent laminate as the resin tends to migrate internally to the laminate during compression.

In a preferred embodiment a second substantially non-reshapable solid material is also adhered to a resin coating which coats the other sheet of backing material.

It will be noted that, in the above process, the backing sheet which is removed is from the external face of the laminate which is the more adhesive of the two. In practice this does not seem to be possible, as any continuous process which attempts this will inevitably result in the backing sheet from the less adhesive external face being removed which is not desired.

The inventors have found that this may in fact be achieved. Preferably, both sheets of backing material are removed, typically simultaneously. This has been found to be achievable, even when one of the backing sheets may be adhered to an external face of the laminate with greater force than the other. This is then followed by bringing into contact with the less adhesive external face, a sheet of replacement backing material, typically followed by compressing the sheet to the laminate.

Preferably the backing material which is removed (either one or two sheets) is of poor quality. A poor quality paper is a paper which has at least one, preferably at least two, more preferably at least three or even at least four of the following attributes: has a release of more than 15.5 cN/10 cm following the PA 3.1-20/Finat 10; has a poor strength with a tensile strength less than 20 N/mm$^2$ according to ISO 527-3/2/500; has a thickness of less than 90 micrometers; has a weight of less than 80 gsm.

Preferably the backing material which is not removed or is the replacement backing material is of good quality. A good quality paper is a paper which has at least one, preferably at least two, more preferably at least three and even at least four of the following attributes: has a release of less than 15.5 cN/10 cm following the PA 3.1-20/Finat 10; has a good strength with a tensile strength of greater than 20 N/mm$^2$ according to ISO 527-3/2/500; has a thickness of from 100 to 200 micrometers; has a weight of from 100 to 200 gsm.

The laminate is then typically rolled up to form a roll and ready to be deposited onto a mold surface by an automatic tape lay-up apparatus.

Thus, in a further aspect, the invention relates to a method of laying down onto a mold surface, a curable flexible electromagnetic hazard resistance laminate as described herein, wherein an external face of the laminate comprises a releasable backing sheet in contact with resin, wherein the laminate is fed automatically from a roll to the surface of the mold by a tool head such that the more adhesive external face of the laminate comprising curable thermosetting resin contacts the mold surface and the laminate adheres to the mold surface as the tool deposits the laminate and the backing sheet is removed, leaving the laminate in place on the surface of the mold without its backing sheet.

This is typically followed by the step of depositing onto the exposed surface of the deposited laminate, a number of prepregs comprising structural fibres and thermosetting resin.

Once the prepregs have been laid down, the arrangement is cured by exposure to elevated temperature, and optionally elevated pressure, to produce an electromagnetic hazard resistant cured laminate.

Thus, in a further aspect, the invention relates to an electromagnetic hazard resistant cured laminate obtainable by the above method.

Such a cured laminate is particularly suitable as a vehicle body component, particularly for an aerospace vehicle body component.

The invention will now be illustrated, by way of example, and with reference to the following figures, in which:

FIG. 1b is a schematic representation of a process for the manufacture of the laminate shown in FIG. 1a.

FIG. 2b is a schematic representation of a process for the manufacture of the laminate shown in FIG. 2a.

FIG. 3b is a schematic representation of a process for the manufacture of the laminate shown in FIG. 3a.

FIG. 4b is a schematic representation of a process for the manufacture of the laminate shown in FIG. 4a.

FIG. 5b is a schematic representation of a process for the manufacture of the laminate shown in FIG. 5a.

FIG. 6b is a schematic representation of a process for the manufacture of the laminate shown in FIG. 6a.

EXAMPLES

A number of electromagnetic resistance laminates comprising a 73 gsm expanded copper foil as the metal component were manufactured with varying resin content. The laminates included, one, two or zero 12 gsm polyester veils available under the name Optimat from Technical Fibre Products (Kendal, UK), constituting the substantially non-reshapable solid material.

All of the laminates were tested for their suitability for laying down onto a mold surface by use of an automated tape lay-up apparatus and were scored for their stability and release properties out of five in an arbitrary scale.

The quality of the surface finish was also assessed, again using a five point arbitrary scale for comparison purposes.

For ATL Stability
1—laminate stretched and deformed unacceptably.
4—Very minor stretching—acceptable.
5—No perceptible stretching.

For ATL Release
1—laminate did not release from backing sheet at all.
3—laminate can release onto mold but only with car taken as to process speed.
4—Acceptable release over a range of process speeds.
5—Excellent release generally.

For Surface Finish
1—Poor surface finish—clear pin holes.
2—Pin holes still visible.
3—No pin holes visible but resin surface not uniform.
4—Smooth surface finish.
5—Superior surface finish.

The results are shown below in table 1.

TABLE 1

|  | 1 | 2 | 3 | 4 | 5 | 6 | 7 |
|---|---|---|---|---|---|---|---|
| Copper weight | 73 | 73 | 73 | 73 | 73 | 73 | 73 |
| Resin 1 weight | 85 | 85 | 85 | 85 | 85 | 85 | 85 |
| Resin 2 weight | 85 | 85 | — | 85 | 85 | 85 | 30 |
| Veil 1 weight | — | 12 | 12 | — | 12 | 12 | 12 |
| Veil 2 weight | — | — | — | 12 | 12 | 12 | 12 |
| ATL results (rate out of 5) | 1 | 4 | 4 | 4 | 5 | 5 | 5 |
| ATL results (rate out of 5) | — | 1 | 1 | 4 | 3 | 5 | 5 |
| Surface finish results (rating out of 10) | 1 | 4 | 3 | 2 | 4 | 4 | 5 |

All weights are in grams per square meter (gsm). Position 1 refers to the side of the metal material not covered in backing paper and position 2 refers to the side of the metal material covered in backing paper.

Examples 1 to 6 were made according to processes 1b to 6b respectively. Example 7 was made by process 6b.

Figure 1A:
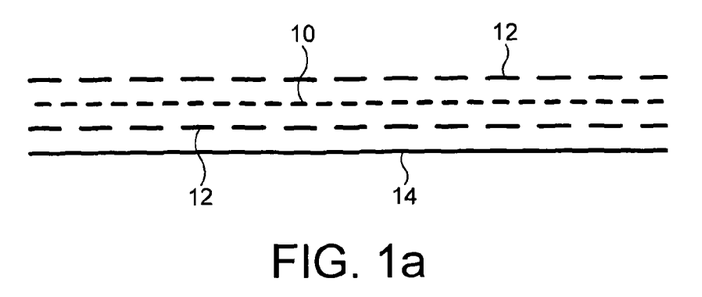
FIG. 1a is a schematic representation of a cross-sectional view through an electromagnetic hazard protection laminate falling outside the present invention.

Turning to the figures, FIGS. 1a to 6a show schematic representations of cross-sections through lightning strike resistance laminates, each of which is manufactured by processes 1b to 6b respectively. FIG. 1a is outside the invention while FIGS. 2a to 6a are according to the invention. Thus, FIG. 1b is outside the invention while FIGS. 2b to 6b are according to the invention. The same numerals are used throughout the figures where the features are equivalent.

The laminates comprise an expanded copper foil 10 constituting the metal component surrounded on both sides by layers of thermosetting resin 12 and backed on one side by backing paper 14.

Figure 2A:
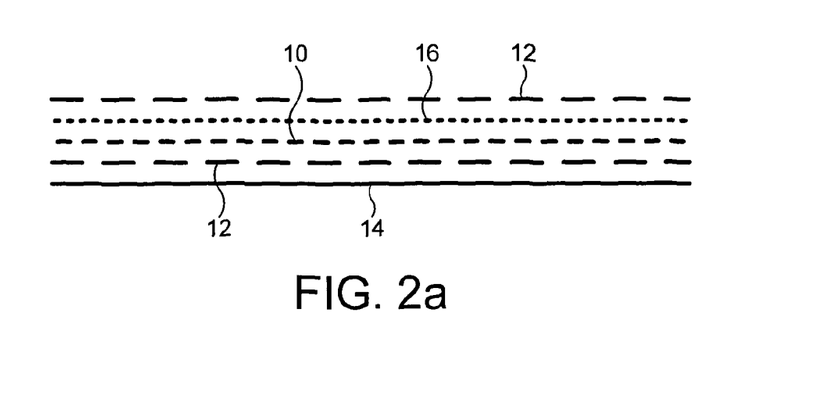
FIG. 2a is a schematic representation of a cross-sectional view through an electromagnetic hazard protection laminate according to the invention.

FIG. 2a shows this arrangement with the addition of a polyester/nylon veil 16, constituting the substantially non-reshapable solid material, positioned on the side of the metal material facing away from the backing paper 14.

Figure 3A:
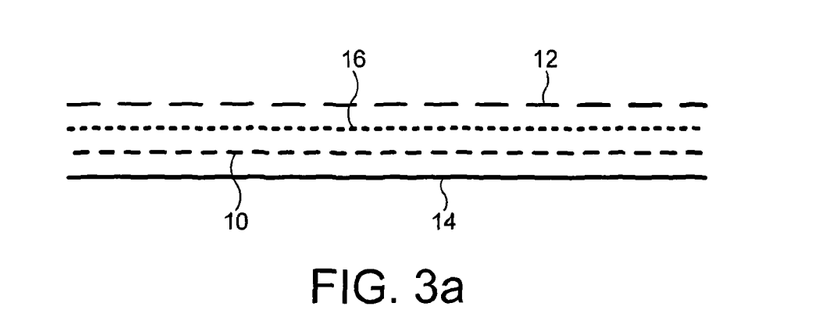
FIG. 3a is a schematic representation of a cross-sectional view through an electromagnetic hazard protection laminate according to the invention.

FIG. 3a shows the arrangement of FIG. 2a but wherein no resin layer 12 is present on the backing paper side.

Figure 4A:
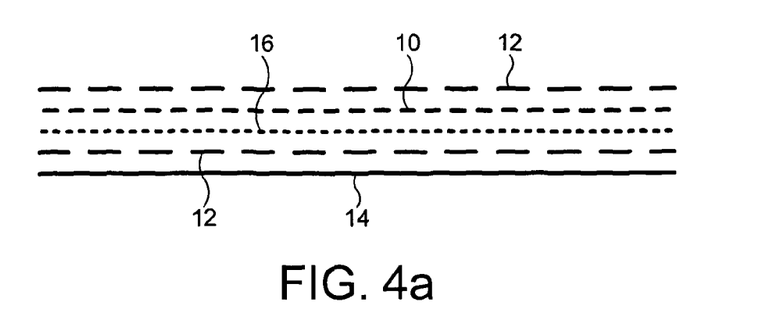
FIG. 4a is a schematic representation of a cross-sectional view through an electromagnetic hazard protection laminate according to the invention.

FIG. 4a shows the arrangement of FIG. 2a but wherein the veil 16 is positioned between the metal material 10 and resin 12 and the backing sheet 14.

Figure 5A:
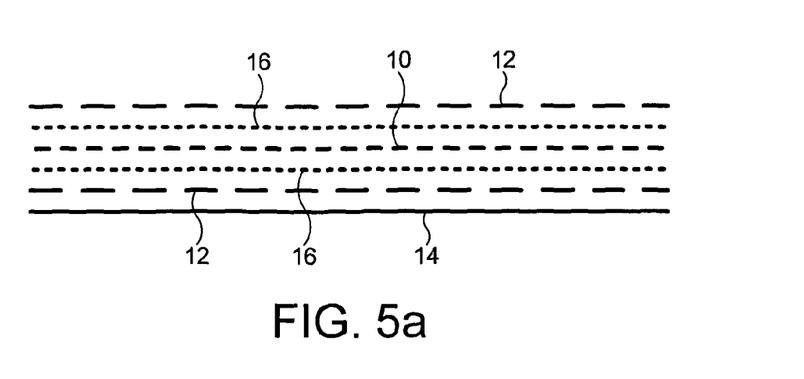
FIG. 5a is a schematic representation of a cross-sectional view through an electromagnetic hazard protection laminate according to the invention.
Figure 6A:
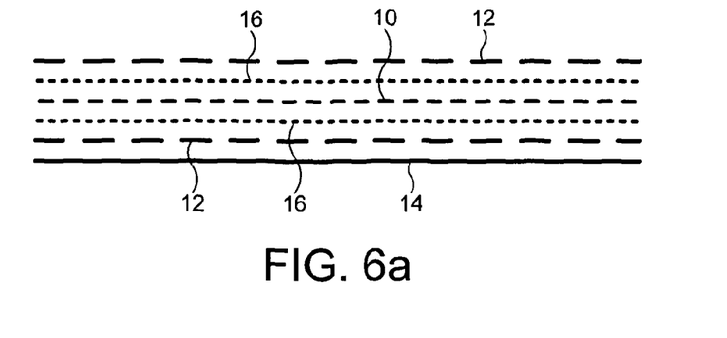
FIG. 6a is a schematic representation of a cross-sectional view through an electromagnetic hazard protection laminate according to the invention.

FIGS. 5a and 6a show the arrangement of FIG. 2a but wherein an additional veil has been positioned between the metal material 10 and resin 12 and the backing sheet 14.

FIGS. 1b to 6b show a reel 20 of the expanded copper foil being fed through heated compaction rollers 28 and eventually rolled up onto wind up reel 32.

Figure 1B:
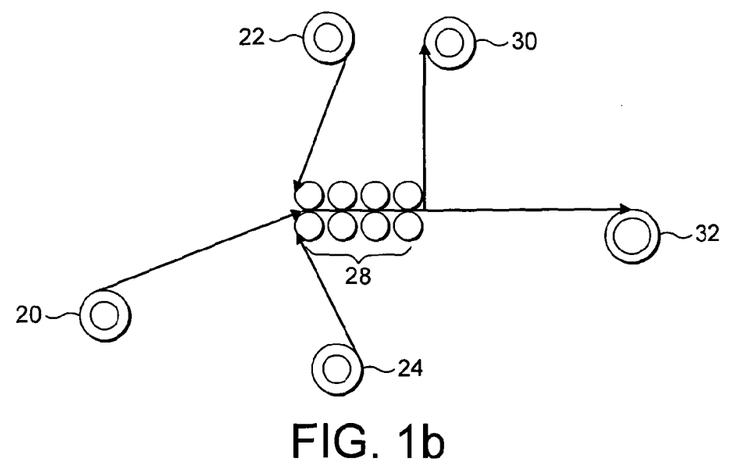

In FIG. 1b the expanded copper foil is brought into contact on both faces with backing paper coated with thermosetting resin from reels 22 and 24 before being fed through heated compaction rollers 28. After compaction, the top sheet of backing paper is removed, leaving behind the resin and is taken up on top paper rewind 30, before the assembly shown in FIG. 1a passes to wind up reel 32.

Figure 2B:
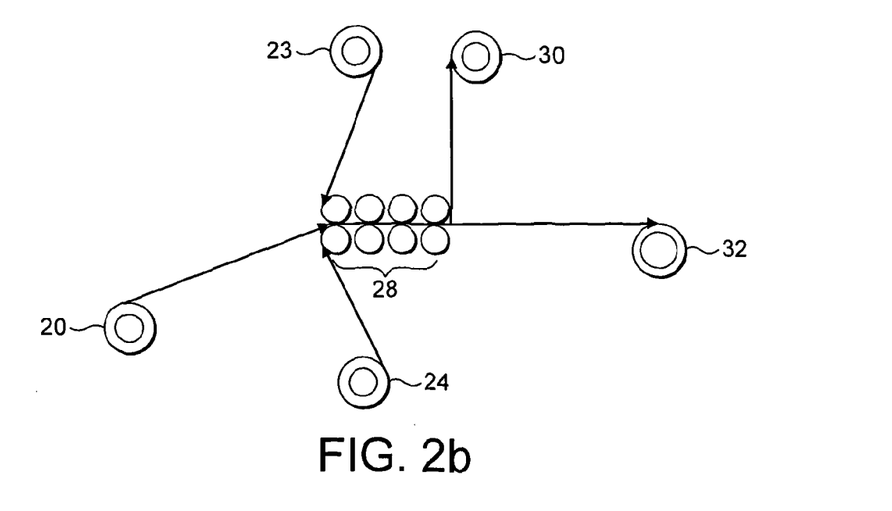

In FIG. 2b, the arrangement is the same as for FIG. 1b except that reel 22 is replaced by reel 23 comprising the veil adhered to a layer of resin which in turn is adhered to backing paper.

Figure 3B:
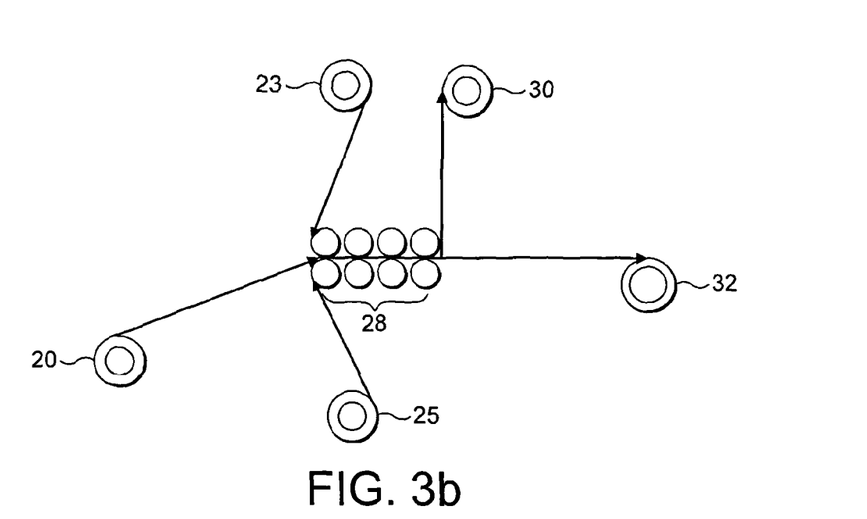

In FIG. 3b, the arrangement is the same as for FIG. 2b, except that reel 24 is replaced by reel 25 which comprises backing paper only.

Figure 4B:
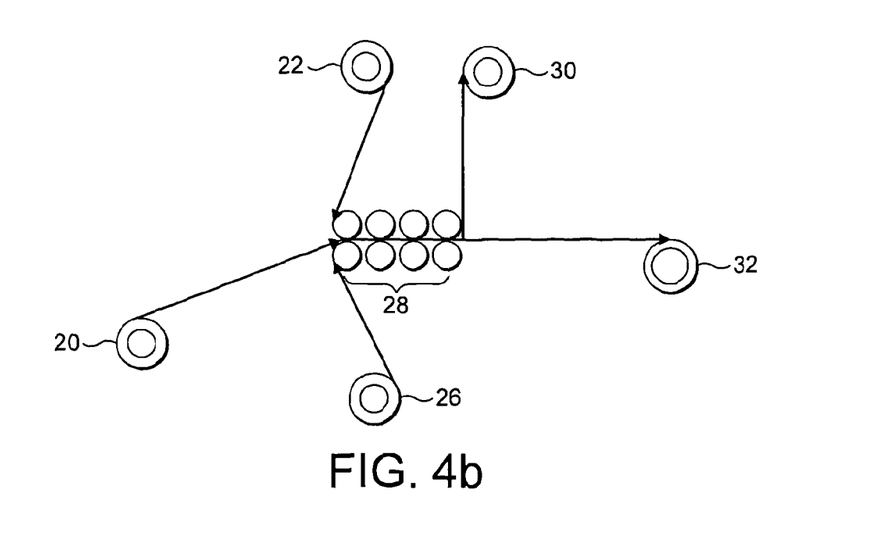

In FIG. 4b, the arrangement is the same as for FIG. 1b, except that reel 24 is replaced by reel 26 comprising the veil adhered to a layer of resin which in turn is adhered to backing paper.

Figure 5B:
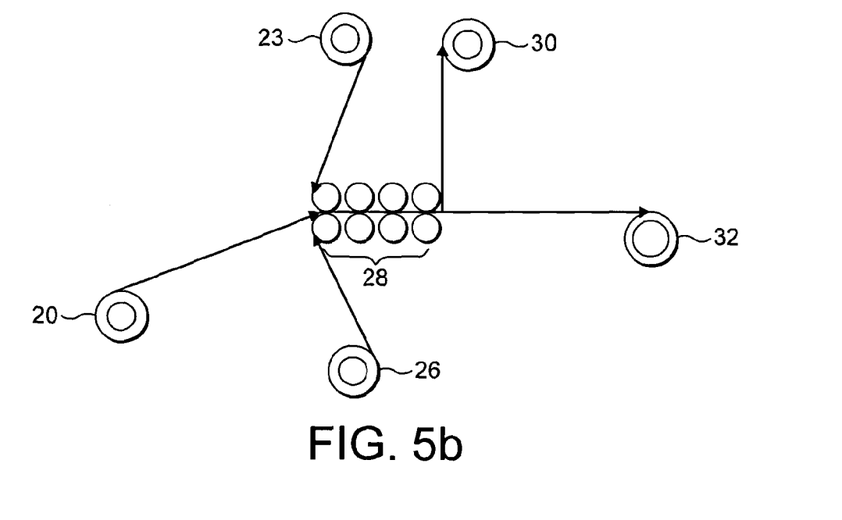

In FIG. 5b, the arrangement is the same as for FIG. 4b, wherein reel 22 is replaced by reel 23 comprising a second veil adhered to a layer of resin which in turn is adhered to backing paper.

Figure 6B:
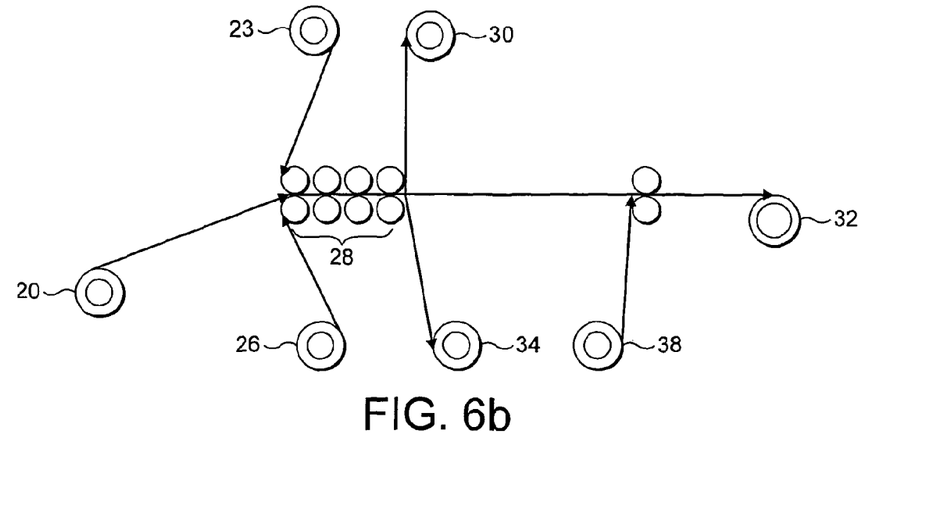

In FIG. 6b, the arrangement is the same as for FIG. 5b, wherein as well as the top sheet of backing paper being removed, the bottom sheet of backing paper is also simultaneously removed and taken up by bottom paper rewind 34. Additionally, a fresh sheet of backing paper is subsequently brought into contact with the laminate in production from repaper unwind 38.

Figure 7:
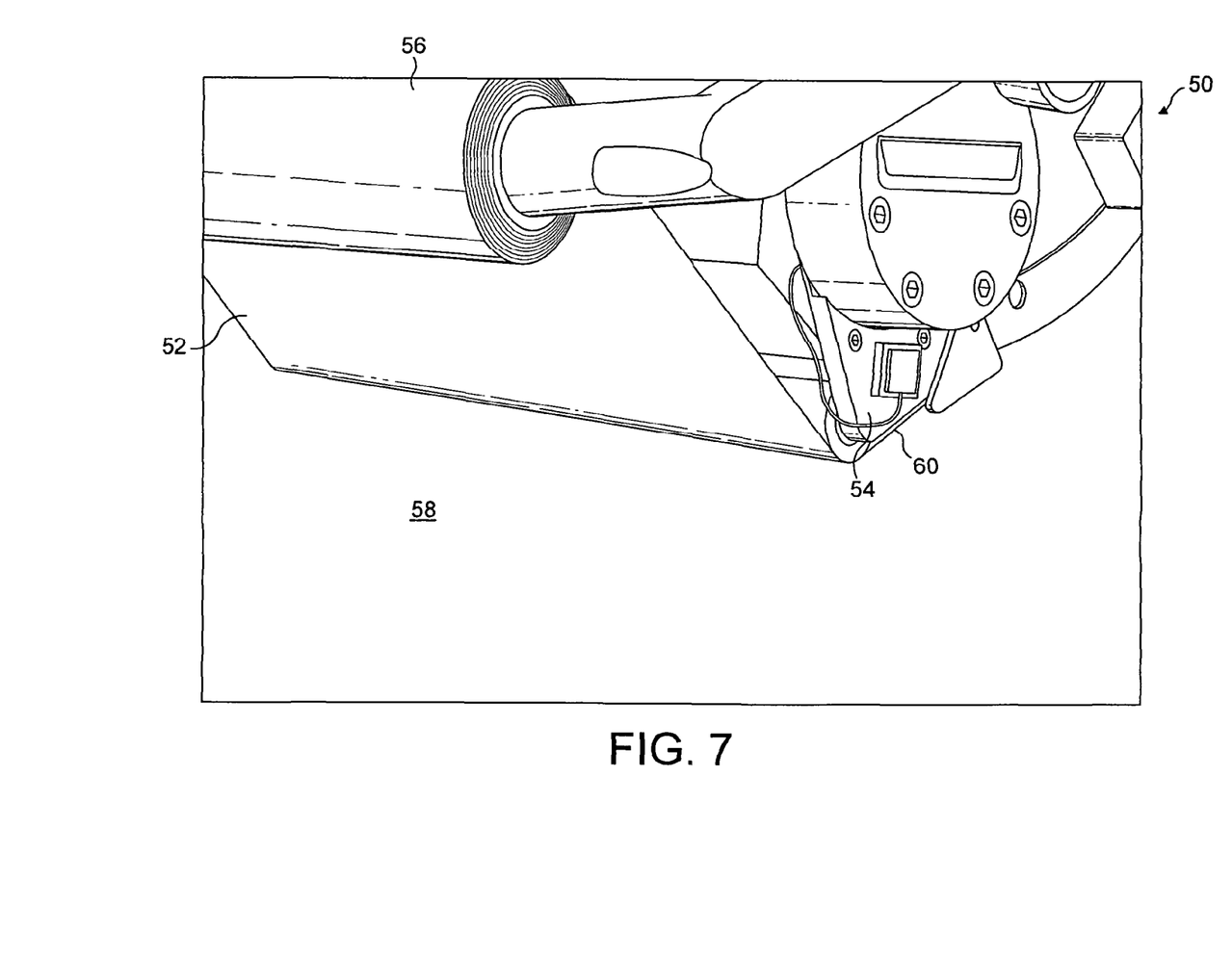
FIG. 7 is an image of the tool head of an automated tape lay-up apparatus suitable for use in the present invention.

FIG. 7 shows an image of the tool head 50 of an automated tape lay-up apparatus suitable for use in the present invention. The laminate 52 is fed to the deposition head 54 after being passed over roller 56. Deposition head 54 presses laminate 52 onto the surface of mold 58. As the laminate 52 contacts the surface of the mold, the adhesion between the laminate 52 and mold 58 is greater than that between the laminate 52 and its backing paper 60 and so it remains adhered to the mold as the backing paper 60 detaches and is taken up on a roller (not shown).

The invention claimed is:

1. A laminate for use in an automated tape laying machine wherein said laminate includes a curable flexible electromagnetic hazard resistance laminate that has a first external face that has a tackiness, said first external face being adhered to an internal surface of a backing sheet and a second external face that has a tackiness, wherein said second external face is to be adhered to a mold surface and, wherein said backing sheet is pulled from said electromagnetic hazard resistance laminate after said second external face is adhered to said mold surface, said laminate comprising:
   a releasable backing sheet having an external surface and an internal surface on which a curable flexible electromagnetic hazard resistance laminate is carried, said curable flexible electromagnetic hazard resistance laminate comprising a first external face having a tackiness, said first external face being adhered to the internal surface of said backing sheet and a second external face having a tackiness, said electromagnetic hazard resistance laminate comprising:
      a conductive layer comprising electrically conductive metal material and thermosetting resin, said conductive layer comprising a first side and a second side located closest to said backing sheet, said conductive metal material weighing from 50 gsm to 200 gsm;
      a veil layer located on the second side of said conductive layer, said veil layer comprising a mat of randomly oriented fibers, said veil layer weighing from 5 gsm to 20 gsm; and
      a first layer of thermosetting resin located adjacent to the first side of said conductive layer, said first layer of thermosetting resin forming said second external face; and
      a second layer of thermosetting resin located adjacent to said veil layer, said second layer of thermosetting resin forming said first external face wherein the ratio of the amount of thermosetting resin in said first layer of thermosetting resin and the amount of thermosetting resin in said second layer of thermosetting resin is 1:1 and wherein the tackiness of said second external face is greater than the tackiness of said first external face such that said laminate exhibits the property of being able to have said releasable backing sheet pulled from said electromagnetic hazard resistance laminate, after said second external face has been adhered to a mold surface, without detaching said electromagnetic hazard resistance laminate from said mold surface.

2. A laminate according to claim 1, which comprises an unbroken pathway of resin through the thickness of said electromagnetic hazard resistance laminate.

3. A laminate according to claim 1, wherein the metal material is an expanded metal foil taking the form of a wire mesh material.

4. A laminate according to claim 1, wherein said first layer of uncured thermosetting resin and said second layer of uncured thermosetting resin comprise an epoxy resin.

5. A laminate according to claim 1, wherein the weight of said laminate, excluding the weight of said metal material, is less than 300 gsm.

6. A laminate according to claim 1, wherein said first layer of thermosetting resin weighs 85 gsm and said second layer of second layer of thermosetting resin weighs 85 gsm.

7. A laminate according to claim 1 further comprising an additional veil layer located on the first side of said conductive layer, said additional veil layer comprising a mat of randomly oriented fibers having a weight of from 5 to 20 gsm.

8. A laminate according to claim 7, wherein said additional veil layer comprises fibers selected from the group consisting of polyester fibers and nylon fibers.

9. A laminate according to claim 8, wherein said additional veil layer comprises a veil of polyester fibers.

10. A laminate according to claim 9, wherein said additional veil weighs 12 gsm.

11. A cured laminate according to claim 1 wherein said backing sheet has been removed and said electromagnetic hazard resistance laminate has been cured.

12. An aerospace vehicle body component, comprising a cured electromagnetic hazard resistance laminate according to claim 11.

13. A laminate according to claim 1, wherein said veil layer comprises fibers selected from the group consisting of polyester fibers and nylon fibers.

14. A laminate according to claim 13, wherein said veil layer comprises a veil of polyester fibers.

15. A laminate according to claim 14, wherein said veil layer weighs 12 gsm.

16. A laminate according to claim 1, wherein said metal material is an expanded copper foil.

17. A laminate according to claim 16, wherein said expanded copper foil weighs 73 gsm.

18. A laminate according to claim 17, wherein said mat of randomly oriented fibers is a polyester veil.

19. A laminate according to claim 18, wherein said polyester veil weighs 12 gsm.

20. A laminate according to claim 19, wherein said first layer of thermosetting resin weighs 85 gsm and said second layer of second layer of thermosetting resin weighs 85 gsm.

* * * * *